United States Patent [19]

Mima et al.

[11] 4,022,960

[45] May 10, 1977

[54] POLYMERS WITH HIGH TRANSPARENCY AND REFRACTIVE INDEX AND PROCESS FOR PRODUCTION THEREOF

[75] Inventors: Seiichi Mima, Toyonaka; Masaru Miya, Ikeda, both of Japan

[73] Assignee: Agency of Industrial Science & Technology, Tokyo, Japan

[22] Filed: Mar. 13, 1973

[21] Appl. No.: 340,715

Related U.S. Application Data

[63] Continuation-in-part of Ser. No. 124,505, March 15, 1971, abandoned.

[52] U.S. Cl. .......................... 526/240; 204/159.22; 526/218; 526/232; 526/321
[51] Int. Cl.$^2$ ....................................... C08F 222/02
[58] Field of Search ............. 260/78.4 E, 78.4 UA, 260/78.5 B, 78.5 UA, 78.5 E; 204/159.22; 526/240, 321, 218, 232

[56] References Cited

UNITED STATES PATENTS

| | | | |
|---|---|---|---|
| 2,940,957 | 6/1960 | Herman | 260/78.5 |
| 2,044,968 | 6/1936 | Bruson | 260/11 |
| 2,087,999 | 7/1937 | Salzberg | 260/11 |
| 2,151,432 | 3/1939 | Lyons et al. | 44/9 |
| 2,279,882 | 4/1942 | D'Alelio | 260/78 |
| 2,754,280 | 7/1956 | Brown | 260/29.6 |
| 2,852,495 | 9/1958 | Hunsucker | 260/78.4 |
| 3,264,272 | 8/1966 | Rees | 260/78.5 |

FOREIGN PATENTS OR APPLICATIONS

| | | | |
|---|---|---|---|
| 254,668 | 6/1926 | United Kingdom | 260/78.4 E |

OTHER PUBLICATIONS

Chem. Abs., vol. 70, No. 116314e (1969).

*Primary Examiner*—John Kight, III
*Attorney, Agent, or Firm*—Kurt Kelman

[57] ABSTRACT

Disclosed are polymers of metal salts of itaconic acid monoester and copolymers of the said metal salts with vinyl monomer, having excellent optical properties such as high refractive index and transparency. The polymers and copolymers are obtained by irradiating with radioactive rays a polymerizable ingredient which is one member selected from the group consisting of (1) one metal salt of itaconic acid monoester, (2) a mixture of two or more metal salts of itaconic acid monoester and (3) a mixture of at least one metal salt of itaconic acid monoester with vinyl monomer. Further, a polymerizable ingredient prepared by adding to the aforementioned polymerizable ingredient a polymerization catalyst is subjected to thermal treatment to produce a polymer.

13 Claims, No Drawings

POLYMERS WITH HIGH TRANSPARENCY AND REFRACTIVE INDEX AND PROCESS FOR PRODUCTION THEREOF

REFERENCE TO RELATED APPLICATION

This is a continuation-in-part of our copending application Ser. No. 124,505 filed in Mar. 15, 1971, now abandoned.

BACKGROUND OF THE DISCLOSURE

Heretofore, inorganic glass has long been used as the material for such optical elements as lenses and prisms. In recent years, remarkable advancement has been made in the development of various kinds of organic high molecular polymers. Organic high molecular polymers possessed of properties required of optical elements have also been suggested. Examples are poly methyl methacrylate and polycarbonate.

The properties which are indispensable for a given substance to serve as the material for optical elements are excellent optical properties such as high refractive index, transparency and homogeneity as well as high degree of hardness.

The known organic high molecular polymers mentioned above are inferior in several points, particularly in refractive index and other optical properties, to inorganic glass. Under the circumstances, therefore, need is acutely felt for perfection of an organic high molecular polymer which is possessed of satisfactory optical properties.

It is a primary object of this invention to provide a novel polymer of one or more metal salts of itaconic acid monoester possessed of excellent optical properties such as high refractive index and transparency. Another object of this invention is to provide a copolymer of the metal salt of itaconic acid monoester with a vinyl monomer, possessed of excellent optical properties such as high refractive index and transparency.

Still another object of the present invention is to provide a process for producing the said polymer by heating a polymerizable ingredient which is a mixture of a polymerization catalyst and a monomer.

Yet another object of the present invention is to provide a process for producing the said polymer by means of irradiation polymerization.

DETAILED DESCRIPTION OF THE INVENTION

This invention relates to a process for the production of polymers possessed of high refractive index by the polymerization of metal salts of itaconic acid monoester and also to the polymers produced by the said method.

More particularly, this invention relates to the polymer of a monomer which is only one metal salt of itaconic acid monoester represented by the generic formula:

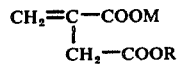

(wherein, R is selected from the class consisting of an alkyl group with 1 – 4 carbon atoms, an allyl group and a methallyl group and M is a metal selected from the class consisting of Pb, Ba and La) and to the polymer of a monomer comprising two or more metal salts of itaconic acid monoester represented by the same generic formula, wherein either or both of M and R denote different component members of their corresponding classes, and also to a process for the production of the polymers.

This invention relates also to the copolymer of a metal salt of itaconic acid monoester with vinyl monomer.

First, a description is given to the process for the production of metal salts of itaconic acid monoester which are used for the present invention.

A metal salt of itaconic acid monoester can be obtained in high yields by having an itaconic acid monoester reacted upon by an oxide or hydroxide of lead, barium or lanthanum or by having an itaconic acid monoester reacted upon by a water-soluble salt of lead, barium or lanthanum in the presence of an appropriate amount of an alkali.

According to the process of this invention, a metal salt of itaconic acid monoester represented by the generic formula:

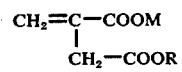

(wherein, M is one member selected from the class consisting of Pb, Ba and La and R is one member selected from the class consisting of an alkyl group with 1 – 4 carbon atoms, an allyl group and a methallyl group can be produced in high yields by having an itaconic acid monoester of the generic formula:

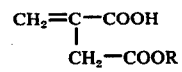

(wherein, R has the same meaning as mentioned above), reacted upon by the oxide or hydroxide of a metal selected from the class consisting of lead, barium and lanthanum or by having the said itaconic acid monoester reacted upon by a water-soluble salt of the said metal in the presence of an alkali.

The itaconic acid monoesters used as the raw material for the process of this invention are known compounds and can be prepared by the method described in the Journal of the Organic Chemistry, 17, p 116 (1952), for example. In the preceeding generic formula, R denotes one member selected from the class consisting of an alkyl group with 1 – 4 carbon atoms, an allyl group and a methally group. When R is an alkyl group, it is desired to be a lower alkyl group such as methyl, ethyl, propyl or butyl group. When R is an allyl group or a methally group, the produced polymer shows an increase in hardness.

The process for the production of metal salts of itaconic acid monoester is described in further depth. The reaction of the itaconic acid monoester with the oxide or hydroxide of metal is effected by dissolving the itaconic acid monoester in a suitable organic solvent, adding the oxide or hydroxide of metal into the resultant solution and allowing the reaction thereof to proceed for several hours at an elevated temperature or at normal room temperature. The water which occurs during the reaction is removed from the reaction system by a suitable means such as, for example, azeotropic distillation. (The removal of this water is optional.) When the solvent is removed from the reaction mixture after completion of the reaction, the metal salt of itaconic acid monoester aimed at is obtained in the form of residue. In the case of a lead salt, the residue may at times be obtained in a crystalline form. Barium salt and lanthanum salt are obtained in the form of a foamed mass. The residue can be converted into a powder by spray drying. The metal salt of itaconic acid monoester acquires more viscosity in proportion as the number of carbon atoms in the alkyl group in the monoester increases (as in butyl group, for example).

Purification of the resultant metal salt is effected by first dissolving the crude metal salt in an appropriate solvent, removing by-produced salts and other insolubles from the solution by filtration or centrifugation and concentrating the filtrate either under reduced pressure or by heating. Then the solvent still remaining in the residue is volatilized completely to give the metal salt in a pure form. The pure metal salt is obtained in the form of white crystals, an amorphous solid or a viscous mass, depending on the kind of alkyl group and the kind of metal.

The production of a metal salt of itaconic acid monoester by the reaction with a water-soluble salt of metal performed in the presence of an alkali is described. In this case, a solution containing an itaconic acid monoester and a soluble salt of lead, barium or lanthanum is mixed with an alkali solution and left to undergo reaction for several hours. The resultant transparent solution is filtered to remove by-produced salts therefrom. The desired metal salt of itaconic acid monoester is obtained by treating the resulting filtrate by the same procedure as mentioned above.

Examples of the soluble metal salts which are desirable for use in this invention are lead nitrate, barium chloride and lanthanum chloride. Although the soluble metal salt is generally used in a substantially equivalent amount with respect to the itaconic acid monoester, it may be used in a slight excess amount. The alkali solutions which may be used include aqueous solutions and alcohol solutions of sodium hydroxide, potassium hydroxide, ammonia, amine, etc. Also, an anion-exchange resin (such as Amberlite CG400) may be used for the same purpose, with water or an alcohol as a medium. The alkali or the anion-exchange resin is desirably to be used in an equimolar amount with respect to the itaconic acid monoester as far as permissible.

The metal salts of itaconic acid monoester are soluble in methanol, ethanol, acetone, dimethylformamide, dimethylsulfoxide, chloroform, dioxane, etc. but are generally difficult of solution in non-polar solvents.

The metal salts of itaconic acid monoester are readily polymerized to give birth to polymers with high degrees of refractive index when they are heated in the presence of a polymerization catalyst or irradiated with radioactive rays. Also, they can be copolymerized with vinyl monomers such as methyl methacrylate, styrene and diallyl diglycol carbonate to produce polymers excelling in transparency. The desirable polymerization catalysts for this purpose are radical catalysts such as peroxides and azobisisobutyronitrile. The amount of the catalyst to be added is selected in the range of from 0.01 to 3% based on the weight of the monomer. The reaction temperature is in the range of from 40° to 120° C, preferably from 50° to 80° C. The polymerization is effected in the form of bulk polymerization. The solvents suitable for this polymerization are those which are usually employed for the purpose of polymerization, examples being alcohols, acetone, dimethylformamide and dimethylsulfoxide. The polymerization is carried out for a period of several hours to twenties of hours, though it is usually brought to completion in about ten hours.

When the polymerization is effected by irradiation with radioactive rays, the monomer which is the metal salt of itaconic acid monoester is, either in its unaltered form or in the form of a solution in a suitable solvent, exposed to radioactive rays, with the temperature maintained in the range of from 0° to 100° C. As radioactive rays for use in this polymerization, gamma ($\gamma$) rays are preferable, although other radioactive rays such as beta ($\beta$) rays and neutron rays which are usually employed for polymerization may similarly be used. The period of irradiation, though variable with dosage and other factors, is usually sufficient on the order of 10 to 20 hours.

The metal salt of itaconic acid monoester can easily be polymerized, as described above, by either catalyst polymerization or irradiation polymerization. Of these two forms of polymerization, the latter proves to be advantageous in the sense that it provides easy control of polymerization velocity and other conditions which determine the properties of the resulting polymer. Also the two forms of polymerization described above may be used in combination.

While the foregoing description on the polymerization has presumed homopolymerization of only one metal salt of itaconic acid monoester, two or more metal salts of itaconic acid monomer in a mixed form may be copolymerized. By the copolymerization of such mixture, there can be obtained a polymer having intermediate properties between those possessed by the component monomers. The polymers and copolymers obtained as described above are colorless transparent rigid resins which are markedly improved in optical properties, especially in refractive index, as compared with known organic high molecular polymers. For example, while poly methyl methacrylate, polycarbonate and poly diallyl diglycol carbonate which have heretofore been used as materials for optical elements show refractive indexex not exceeding 1.5, the polymers obtained by the process of this invention have refractive indexes in the range of from 1.5 to 1.6 as is evident from the preferred embodiments cited hereinafter. Thus, the polymers according to this invention are suitable as materials to be used for the molding of optical elements such as lenses and prisms.

The present invention is now described by referring to its preferred embodiments, which are intended to be illustrative of and not limitative in any way of the invention.

EXAMPLE 1

In a test tube, 10g of monomethyl lead itaconate was heated at 70° – 80° C for five minutes. At the end of the heating, the tube was sealed under reduced pressure. Then the tube was maintained at about 30° C for about 10 hours at a distance of 20cm from a cobalt 60 source having a dosage level of 3,000 curies, so as to permit the contents thereof to undergo polymerization. After the irradiation with the gamma rays, the contents of the tube were heated at 115° C for 1 hour. Consequently, there was obtained a colorless transparent polymer. The polymer was found to have a refractive of index 1.60 and a total light transmittance of 92.8%.

EXAMPLE 2

In a test tube, 10g of monomethallyl lead itaconate was treated by repeating the procedure of Example 1. Consequently, there was obtained a colorless transparent polymer having a refractive index of 1.59 and a total light transmittance of 92.3%.

EXAMPLE 3

In 20cc of methanol were dissolved 10g of monoethyl lead itaconate and 10g of monoethyl lanthanum itaconate. The solution was deprived of methanol under reduced pressure to produce a colorless viscous mass. This mass was treated by following the procedure of Example 1 to produce a colorless transparent copolymer. The copolymer was found to have a refractive index of 1.58 and total light transmittance of 92.6%.

EXAMPLE 4

In 10g of styrene, 10g of monoethyl lead itaconate and 5g of monoethyl barium itaconate were dissolved and 20mg of azobisisobutylonitrile was added thereto. The resultant mixture was heated at 50° C under reduced pressure for 20 hours. Then, it was maintained at room temperature for 30 hours at a distance of 50cm from a cobalt 60 source having a dosage level of 3,000 curies, followed by a heat treatment given at about 90° C for 3 hours. Consequently, there was obtained a copolymer having a refractive index of 1.59 total light transmittance of 91.5%.

EXAMPLE 5

A solution of 10g of monoallyl lead itaconate in 10g of methyl methacrylate was sealed in a test tube under reduced pressure. The tube was maintained at 20° C for 40 hours at a distance of 50cm from a cobalt 60 source having a dosage level of 3,000 curies. After the irradiation, the contents of the tube were heated at 80° C for 10 hours. Consequently, there was obtained a colorless transparent copolymer having excellent hardness. This copolymer was found to have a refractive index of 1.55 and a total light transmittance of 92.0%.

EXAMPLE 6

An autoclave was charged with 5g of monobutyl lead itaconate, 20g of vinyl chloride monomer, 50cc of benzene and 30mg of azobisisobutyronitrile. The contents of the autoclave were heated under agitation for 15 hours to undergo polymerization. After the polymerization, the polymer which had been educed was separated by filtration to obtain 20g of copolymer. The copolymer with vinyl chloride was colorless and transparent, excelled in thermal stability and weatherability and had a refractive index of 1.56 and a total light transmittance of 92.1%.

EXAMPLE 7

A solution of 7g of monoethyl lead itaconate in 10g of methyl methacrylate was prepared and 3g of monoethyl barium itaconate and 100mg of t-butylperoxy-2-ethyl-hexaonate were added to be dissolved therein. The resultant mixture was maintained at 60° C under a current of nitrogen gas for 15 hours so as to undergo polymerization. The polymerized mass was further heated at 90° C for three hours to produce a colorless transparent copolymer. The product was found to have a refractive index of 1.55 and a total light transmittance of 92.0%.

EXAMPLE 8

A solution of 15g of monoethyl lead itaconate in 25g of methyl methacrylate was prepared and 10g of monomethyl lanthanum itaconate and 250mg of benzoyl peroxide were added to be dissolved therein. The resultant mixture was treated in the same manner as described in Example 7 to undergo polymerization. Consequently, there was obtained a copolymer having a refractive index of 1.54 and a total light transmittance of 91.5%.

EXAMPLE 9

A mixture of monoethyl lead itaconate and methyl methacrylate was subjected to cast polymerization. The mold used for this case polymerization was made of glass. A solution of 10g of monoethyl lead itaconate in 10g of methyl methacrylate was prepared and 0.6g of benzoyl peroxide was added to be dissolved therein. The resultant mixture was poured in the said glass mold and, after removal of bubbles therefrom, heated at 55° C for 5 hours, then elevated to 75° C at a temperature increase rate of 1° C/hour and held at 75° C for 48 hours to undergo polymerization. After completion of the polymerization, the resin was removed from the mold and subjected to a heat treatment at 90° C for 1 hour. Consequently, there was obtained a molded resin free from distortion. It was found to have a refractive index of 1.55 and a total light transmittance of 92.7%.

EXAMPLE 10

A solution of 12g of monoethyl lead itaconate in 16g of methyl methacrylate was prepared and 12g of diallyl diglycol carbonate and 1.2g of benzoyl peroxide were added to be dissolved therein. The resultant mixture was subjected to cast polymerization by repeating the procedure of Example 9. The molded resin consequently formed was found to have a refractive index of 1.53 and a total light transmittance of 93.1%.

EXAMPLE 11

A solution of 15g of monomethyl lead itaconate in 15g of methyl methacrylate was prepared and 20g of styrene and 250mg of benzoyl peroxide were added to be dissolved therein. The resultant mixture was left to stand at 60° C for 8 hours in a current of nitrogen gas to undergo polymerization, and it was then maintained at normal room temperature for 30 hours at a distance of 50cm from a cobalt 60 source having a dosage level of 3,000 curies. After the irradiation, the mass was subjected to a heat treatment at 90° C for 3 hours to produce a colorless transparent copolymer having a refractive index of 1.57 and a total light transmittance of 92.8%.

What is claimed is:
1. A transparent crosslinked polymer having a high refractive index prepared from the monomer which comprises a metal salt of itaconic acid monoester, the said metal salt of itaconic acid monoester being represented by the generic formula:

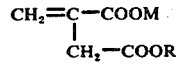

wherein, M is one member selected from the class consisting of Pb, Ba and La and R is one member selected from the class consisting of an alkyl group with 1 − 4 carbon atoms, an allyl group and a methallyl group.

2. A transparent crosslinked copolymer having a high refractive index prepared from at least one metal salt of itaconic acid monoester and a vinyl monomer, the said metal salt of itaconic acid monomer being represented by the generic formula:

$$CH_2=C-COOM$$
$$\phantom{CH_2=}|$$
$$\phantom{CH_2=}CH_2-COOR$$

wherein, M is one member selected from the class consisting of Pb, Ba and La and R is one member selected from the class consisting of an alkyl group with 1 − 4 carbon atoms, an allyl group and a methallyl group.

3. A copolymer according to claim 2, wherein the vinyl monomer is at least one member selected from the class consisting of methyl methacrylate, styrene, and diallyl diglycol carbonate.

4. A process for the production of a novel transparent crosslinked polymer having a high refractive index, which comprises, preparing a polymerizable ingredient by incorporating a radical polymerization catalyst into one member selected from the group consisting of:
1. a metal salt of itaconic acid monoester represented by the generic formula:

$$CH_2=C-COOM$$
$$\phantom{CH_2=}|$$
$$\phantom{CH_2=}CH_2-COOR$$

wherein, M is one member selected from the class consisting of Pb, Ba and La and R is one member selected from the class consisting of an alkyl group with 1 − 4 carbon atoms, an allyl group and a methallyl group.
2. a mixture of at least two metal salts of itaconic acid monoester represented by the generic formula:

$$CH_2=C-COOM$$
$$\phantom{CH_2=}|$$
$$\phantom{CH_2=}CH_2-COOR$$

wherein, M is one member selected from the class consisting of Pb, Ba and La and R is one member selected from the class consisting of an alkyl group with 1 − 4 carbon atoms, an allyl group and a methallyl group and
3. a mixture of at least one metal salt of itaconic acid monoester defined in (1) above with a vinyl monomer, blending the polymerizable ingredient, and thereafter heating the blended polymerizable mixture at temperatures in the range of from 40° to 120° C thereby solid polymerizing the ingredient.

5. A process according to claim 4, wherein the radical polymerization catalyst is one member selected from the group consisting of peroxides and azobisisobutyronitrile.

6. A process according to claim 5, wherein the amount of the radical polymerization catalyst to be incorporated is in the range of from 0.01 to 3% by weight based on the polymerizable ingredient.

7. A process according to claim 4, wherein the vinyl monomer is one member selected from the group consisting of methyl methacrylate, styrene, and diallyl diglycol carbonate.

8. A process for the production of a novel transparent crosslinked polymer having a high refractive index, which comprises preparing a polymerizable ingredient using one member selected from the group consisting of:
1. at least one metal salt of itaconic acid monoester represented by the generic formula:

$$CH_2=C-COOM$$
$$\phantom{CH_2=}|$$
$$\phantom{CH_2=}CH_2-COOR$$

wherein, M is one member selected from the class consisting of Pb, Ba and La and R is one member selected from the class consisting of an alkyl group with 1 − 4 carbon atoms, an allyl group and a methallyl group and
2. a mixture of the metal salt of itaconic acid monoester defined in (1) above with a vinyl monomer, and irradiating the polymerizable ingredience with radioactive rays thereby polymerizing the ingredient.

9. A process according to claim 8, wherein the radioactive rays are one member selected from the group consisting of gamma (γ) rays, beta (β) rays and neutron rays.

10. The transparent polymer of claim 1 having a refractive index in the range of from 1.5 to 1.6.

11. The transparent copolymer of claim 2 having a refractive index in the range of from 1.5 to 1.6.

12. The process of claim 4 wherein the solid polymerized ingredient has a refractive index in the range of from 1.5 to 1.6.

13. The process of claim 8 wherein the solid polymerized ingredient has a refractive index in the range of from 1.5 to 1.6.

* * * * *